(12) United States Patent
Robinson (10) Patent No.: US 7,914,662 B2
(45) Date of Patent: Mar. 29, 2011

(54) WATER TREATMENT APPARATUS (76) Inventor: Vivian Noel Edward Robinson, Five Dock (AU)

(*) Notice: Subject to any disclaimer, the term of this patent is extended or adjusted under 35 U.S.C. 154(b) by 648 days.

(21) Appl. No.: 11/993,562

(22) PCT Filed: Jul. 3, 2006

(86) PCT No.: PCT/AU2006/000934
§ 371 (c)(1),
(2), (4) Date: Dec. 21, 2007

(87) PCT Pub. No.: WO2007/003003
PCT Pub. Date: Jan. 11, 2007

(65) Prior Publication Data
US 2010/0084272 A1    Apr. 8, 2010

(30) Foreign Application Priority Data
Jul. 5, 2005    (AU) ................................ 2005903543

(51) Int. Cl.
*C02F 1/461*    (2006.01)
(52) U.S. Cl. ........ 205/745; 205/742; 204/271; 204/272; 204/554; 204/555; 204/556; 204/670; 204/671; 204/672; 204/673

(58) Field of Classification Search .................. 205/742, 205/745; 204/271, 272, 554, 555, 556, 670, 204/671, 672, 673
See application file for complete search history.

(56) References Cited

U.S. PATENT DOCUMENTS

| | | | | |
|---|---|---|---|---|
| 6,488,835 B1* | 12/2002 | Powell | ........................ | 205/744 |
| 6,800,206 B2* | 10/2004 | Robinson | ...................... | 210/746 |
| 6,887,368 B2* | 5/2005 | Khalemsky et al. | .......... | 205/702 |
| 2003/0106854 A1* | 6/2003 | Robinson | ...................... | 210/748 |
| 2003/0196938 A1 | 10/2003 | Arnaud | | |
| 2006/0108273 A1* | 5/2006 | Perri et al. | .................... | 210/275 |

FOREIGN PATENT DOCUMENTS

| | | |
|---|---|---|
| DE | 19642999 A1 | 8/1997 |
| WO | 9943617 A1 | 9/1999 |
| WO | 0066500 A1 | 11/2000 |
| WO | 0168532 A1 | 9/2001 |
| WO | 2005068374 A1 | 7/2005 |

* cited by examiner

*Primary Examiner* — Bruce F Bell
(74) *Attorney, Agent, or Firm* — David A. Guerra (57) ABSTRACT

A portable apparatus for treating polluted water by electro-coagulation. The apparatus comprising at least two electrodes (1,2). The apparatus also includes a housing (4), electrically isolated from the at least two electrodes (1,2), to which the at least two electrodes (1,2) are fixed spaced apart from one another. When the at least two second electrodes (1,2) are at least partly submerged in the polluted water and provided with an electrical potential, one of the at least two electrodes (2) is sacrificial so as to provide ions to the polluted water.

22 Claims, 7 Drawing Sheets

WATER TREATMENT APPARATUS

FIELD OF THE INVENTION

The present invention relates generally to a water treatment apparatus and, more particularly, to a portable apparatus for treating polluted water by electrocoagulation.

The invention has been primarily developed for use in cleaning water to potable standard, and will be described hereinafter with reference to this application. However, the invention is not limited to this particular use and, for example, is also suitable for cleaning to small volumes of industrially polluted water for compliant discharge.

BACKGROUND

There are many situations where natural water supplies contain pollutants, such as clay, animal waste, industrial pollution and other sources of pollutants that either make the water appear unsafe for drinking or unpalatable. These include remote communities in isolated regions and hikers, travelers, campers and similar travelling in remote regions. Taking a full supply of safe drinking water is both costly and bulky.

There are also many situations where natural or man made disasters cause damage or destruction to the reticulated water supply such that, although there is an adequate amount of water available, it is generally polluted with sewer/septic overflow, decaying organic matter or other pollutants. Drinking such water could result in consumers becoming infected with cholera or any number of other water borne diseases. Not drinking such water would result in rapid death due to dehydration.

There are a number of known devices which seek to address the above problem, including: chlorine tablets (to disinfect the water); filters to remove the pollutant; and others. A disadvantage of chlorine is, even if it is added to the water, the resultant unappealing taste of the water means that it is not liked by the populace. Storing chlorine tablets is also difficult and they are not easily available for many situations. A disadvantage of many emergency filters is that they can only be used for short periods of time before they become clogged. A disadvantage of reusable filters that can remove most pollutants is that they can be expensive. Also, filters do not remove some pollutants like mercury, lead, arsenate and similar. Further, many so-called "emergency" filters do not remove some of the smaller clay particles and the filtered water still thus appears unpalatable to drink, even though it is generally safe.

It is an object of the present invention to substantially overcome, or at least ameliorate, one or more of the above disadvantages.

By way of further background, the process of coagulation has been successfully used in the industry to achieve good water treatment results. In that process, trivalent metals, usually aluminium and/or iron, are used for cleaning water. Their ions, $Al^{+++}$ and $Fe^{+++}$ respectively, are added to polluted water in the form of alum (aluminium sulphate) or ferric chloride. The metal ions bind with the pollutant and assist in removing the pollutant from the water, either causing it to sink to the bottom (settling ponds), float to the top (dissolved air flotation) or increase the size of the pollutants and allow them to be more easily filtered. Irrespective of the mechanism of removal, the use of these ions is wide spread in the water treatment industry. Chemical treatment of water is often not viable because it adds to the salinity of the water and the chemicals are quite hazardous.

In the process known as electrocoagulation, those same ions are added to the water electrolytically. In that process, sacrificial electrodes are placed in the polluted water and a voltage applied to them. This causes an electric current to flow between the electrodes, which releases some of the anode metal into solution via the reactions:

$$Al-3e- \text{ gives } Al^{+++} \qquad (1$$

and $$Fe-3e- \text{ gives } Fe^{+++} \qquad (2$$

The electricity also produces a reaction at the cathode when the electrons leave the cathode and go into the water, which reaction is given by:

$$2H_2O-4e- \text{ gives } 2(OH)-+2H_2 \qquad (3$$

This reaction liberates hydrogen gas.

In view of the complexities of the reactions and the power requirements to treat large volumes of water, known systems of this type are connected to large power supplies and used to process large volumes of water, typically many cubic metres per day. The process requires strict monitoring of the parameters involved, without which the process will fail and the water will not be cleaned. While suitable for large applications, they are not suited for small, 'first stage' water treatment or for regions with very little funding capability.

SUMMARY OF THE INVENTION

In a first aspect, the present invention provides a portable apparatus for treating polluted water by electrocoagulation, the apparatus comprising:
  at least two electrodes;
  a housing, electrically isolated from the at least two electrodes, to which the at least two electrodes are fixed spaced apart from one another,
  wherein, when the at least two electrodes are at least partly submerged in the polluted water and provided with an electrical potential, one of the at least two electrodes is sacrificial so as to provide ions to the polluted water.

One of the at least two electrodes preferably provides coagulating ions to the polluted water.

The at least two electrodes preferably have combined mass of less than approximately 15 kg. More preferably, the at least two electrodes have a combined mass of approximately 5, 2, 1 or 0.2 kg.

The electrodes are preferably formed from any one of:
  metal foil wrapped around a solid former;
  plates of thin bent metal;
  plates of flat metal; and
  cylindrical metal rods.

The least two electrodes preferably have a cross-section of any one of:
  oval;
  circular;
  rectangular;
  annular; and
  any closed or nearly closed shape.

The apparatus preferably further comprises a power supply adapted to provide said electrical potential to the at least two electrodes. The power supply can preferably produce a voltage of one to one hundred volts. More preferably, the power supply can produce a voltage of two to forty volts. Even more preferably, the power supply can produce a voltage of three to fifteen volts.

The apparatus preferably further comprises a power supply adapted to supply said electrical potential to the at least two electrodes. The apparatus preferably further comprises an on/off control for the power supply.

In one form, the power supply is a direct current power supply. More preferably, the direct current power supply includes any one of:
- a rechargeable battery;
- a single use battery;
- a solar panel;
- a portable manual powered electrical generator;
- a wind powered generator;
- a fossil fuel powered generator and
- a mains powered DC power supply.

In another form, the power supply is a slowly varying alternating current power supply. In a yet further form, the power supply is a rectified alternating current power supply.

Each of the at least two electrodes preferably have approximately equal cross-sectional areas and are approximately parallel in their spaced apart separation.

The apparatus preferably further comprises an insulated spacer between the distal ends of the at least two electrodes to maintain their spaced apart separation.

In an embodiment, the apparatus comprises three said electrodes arranged substantially parallel, side-by-side and spaced apart with the electrical potential supplied to the outermost two of the three said electrodes. In another embodiment, the apparatus comprises three said electrodes arranged substantially parallel, side-by-side and spaced apart with the electrical potential supplied to each of the three said electrodes, with the outermost two electrodes having the same polarity and the inner electrode having the opposite polarity.

In yet another embodiment, the apparatus comprises five said electrodes arranged substantially parallel, side-by-side and spaced apart with the electrical potential supplied to the outermost two of the five said electrodes. In yet another embodiment, the apparatus comprises five said electrodes arranged substantially parallel, side-by-side and spaced apart with the electrical potential supplied to the two outermost and one central of the five said electrodes.

In a yet further embodiment, the at least two electrodes are in the form of a rod substantially concentrically positioned within a cylinder. In a yet further embodiment, the at least two electrodes are in the form of substantially concentrically arranged inner and outer cylinders and a rod substantially concentrically arranged within the inner cylinder, and wherein the electrical potential is supplied to the rod and the outer cylinder. In a yet further embodiment, the at least two electrodes are in the form of substantially concentrically arranged inner and outer cylinders and a rod substantially concentrically arranged within the inner cylinder, and wherein the electrical potential is supplied to the rod, the inner cylinder and the outer cylinder.

In another embodiment, the at least two electrodes are in the form of first and second substantially parallel spaced apart rods. In a yet another embodiment, the at least two electrodes are in the form of four substantially parallel rods angularly spaced apart by approximately 90 degrees around a central longitudinal axis, and wherein the electrical potential is supplied to all of the rods.

In a yet another embodiment, the at least two electrodes are in the form of four flat plates, arranged in alternating substantially parallel pairs, angularly spaced apart by approximately 90 degrees around a central longitudinal axis, and wherein the electrical potential is supplied to all of the plates. In a yet another embodiment, the at least two electrodes are in the form of a flat plate and two substantially parallel spaced apart rods, and wherein the electrical potential is supplied to the flat plate and both of the rods. In a yet another embodiment, the at least two electrodes are in the form of a relatively wide flat plate and two relatively narrower flat plates parallel to each other and spaced apart from the relatively wide plate, and wherein the electrical potential is supplied to the two relatively narrow flat plates.

The at least two electrodes are preferably produced from any one of
- aluminium;
- iron;
- magnesium;
- copper;
- stainless steel;
- platinum coated titanium; and
- silver.

At least one of the at least two electrodes may be composed of more than one of:
- aluminium;
- iron;
- magnesium;
- copper;
- stainless steel;
- platinum coated titanium; and
- silver.

The housing is preferably in the form of a handle adapted for manual gripping.

The apparatus preferably further comprises a voltage monitoring circuit across the at least two electrodes. The voltage monitoring circuit preferably includes an indicator adapted to indicate when the electrical potential is sufficient to provide ions to the polluted water. In one form, the voltage monitoring circuit is within the housing. In another form, the voltage monitoring circuit is external to the housing.

In one arrangement, the insulated housing forms part of a container.

In a second aspect, the present invention provides a method of treating polluted water by electrocoagulation with a portable apparatus,
the apparatus comprising:
  at least two electrodes; and
  a housing, electrically isolated from the at least two electrodes, to which the at least two the electrodes are fixed spaced apart from one another,
the method comprising the following steps:
  at least partially submerging the at least two electrodes in polluted water;
  providing an electrical potential to the at least two electrodes to cause at least one of the at least two electrodes to be sacrificial and provide ions to the polluted water;
  determining the extent of the coagulation in the polluted water; and
  gripping the housing and manually adjusting the extent of submergence of the at least two electrodes in the polluted water in order to adjust the determined coagulation.

The at least one sacrificial electrode preferably provides coagulating ions to the polluted water.

In one form, the step of determining the coagulation in the polluted water includes observing the water surrounding the at least two electrodes to see if a layer of material starts to form over the surface of the water within a few minutes and, if no such layer starts to form, reducing the submergence of the at least two electrodes in the polluted water.

In another form, the step of determining the coagulation in the polluted water includes monitoring the voltage across the at least two electrodes and, if the voltage drops below a predetermined level, reducing the submergence of the at least two electrodes in the water until the voltage is above or at the predetermined voltage.

In yet another form, the step of determining the coagulation in the polluted water includes determining the conductivity range of the water to be treated along with the characteristics of the supply electrical potential and calculating the area of the at least two electrodes which must be submerged in the polluted water to maintain the predetermined voltage sufficient for coagulation.

In a third aspect, the present invention provides a portable apparatus for treating polluted water by electrocoagulation, the apparatus comprising:
- a first electrode defining an volume;
- at least one second electrode;
- means to electrically isolate the first electrode from the at least one second electrode to allow introduction of the at least one second electrode into said volume without contacting the first electrode,
- wherein, when polluted water is introduced into said volume to at least partly submerge the at least one second electrode and an electrical potential is provided to the first electrode and the at least one second electrode, at least one of the first electrode and the at least one second electrode is sacrificial so as to provide ions to the polluted water.

The first electrode is preferably in the form of a container having an open upper end and the second electrode is in the form of a rod having an insulated cap on one end and an insulated peripheral spacer at, or near, its other end. The at least one second electrode is preferably sacrificial.

In a fourth aspect, the present invention provides a method of treating polluted water by electrocoagulation with a portable apparatus,
the apparatus comprising:
- a first electrode defining a volume;
- at least one second electrode; and
- means to electrically isolate the first electrode from the at least one second electrode,
the method comprising the following steps:
- introducing polluted water into the volume;
- at least partially submerging the at least one second electrode in the polluted water;
- providing an electrical potential to the first electrode and the at least one second electrode to cause at least one of the first electrode and the at least one second electrode to be sacrificial and provide ions to the polluted water;
- determining the extent of the coagulation in the polluted water; and
- manually adjusting the extent of submergence of the at least one second electrode in the polluted water in order to adjust the determined coagulation.

The at least one second electrode is preferably sacrificial.

In a further aspect, the present invention provides a set of metal plates, strips or blades that, for the sake of simplicity, shall be called plates. These plates can have any convenient shape of length breadth and thickness, preferably of a size that their combined weight can be easily held and moved by most people using one hand. For many people, an item can be held in one hand if it weighs less than 15 kilograms (kg). However, the device may have any total weight less than that, including 0.2 kg or less, approximately 1 kg, 2 kg, 5 kg or any other value as considered suitable. The construction of these plates can be anything that enables them to be supported by their own strength, ranging from metal foil wrapped around a solid former, plates of thin metal which are bent to add strength, to flat material of any thickness. They may even be oval, circular or any closed or nearly closed shape. The number of plates must be a minimum of two, with one of those plates being the surface of a metal container, and can be any convenient number above that. This number depends upon the available voltage supply.

In order for the electrocoagulation process to operate, it requires the voltage between the plates to be sufficient that it can drive metal from the plates into the water. For example if aluminium is used as the sacrificial electrode, it generally requires a minimum voltage of at least 2 volts, and preferably 3 volts for this to occur. Although the electric potential difference between Al and calomel electrodes is only +1.55 volts, a greater voltage is required for the reaction to be effective. Experiments have shown that optimum performance requires a voltage between 3 and 4 volts. Below 3 volts, the reaction is slow and above 4 volts, the additional voltage requires an increase in power to do the same work.

The minimum requirement for the apparatus is a set of appropriate electrodes mounted to, or held by, an insulated housing or assembly and an ability to connect to a voltage source. Most voltage sources, be they battery or transformer/rectifier, have an internal resistance such that, when the electrodes are placed in the water, an electrical current will flow and as such the voltage may reduce below the rated value of that source. This is particularly true for the small portable process required. The current that flows between the electrodes depends upon the voltage applied and the conductivity of the water. If the device draws too much current because the conductivity is too high, the voltage will drop and the process will not work. The conductivity of water considered suitable for this type of application varies between less than 35 micro siemens per cm to over 2,000 micro siemens per cm, a conductivity range of greater than 60. Providing a power supply/electrode combination that can handle that large range of conductivities is not always possible for any fixed area electrodes.

Research has shown that if the electrodes are not fixed, different areas can be inserted to achieve satisfactory results with different conductivities of water. If the water is low in conductivity, for example in pollution free rainforest regions, all of the electrodes can be inserted to give maximum surface area. The current flowing will not be sufficient for the voltage to drop sufficiently to prevent the reaction from occurring. When the conductivity gets high, for example salt water ingression into ground water, only part of the electrodes need to be placed into the water. This limits current flow and ensures that the minimum voltage is maintained and the electrocoagulation reaction occurs. However, if the electrodes are fixed, the current flow can be so large in high conductivity water that it reduces the voltage too much, preventing the reaction from occurring.

It should be pointed out that choosing a water type, e.g., rainforest water or marsh water—chosen by the conductivity range of the water, would enable the system to operate with a particular power supply and fixed electrodes, by the appropriate choice of electrode area and power supply. In this regard, fixing a voltage supply and electrode area chosen for a particular conductivity range, such that it maintains the minimum voltage required for the reaction to occur, would be considered to be part of this invention in so much as it uses calculation to maintain the minimum voltage. The maintenance of the minimum voltage is an essential part of this invention, without which it will not work. The required minimum voltage can be lower than 1 volt, although the rate of operation varies inversely with voltage.

It should also be pointed out that the wide variability between the internal resistances of different batteries and power sources makes specification of suitable electrode areas and voltages difficult. For example, a 12 volt automobile battery has low internal impedance and can provide considerable current without much drop in voltage. Powering the same device from 12 volt "torch" batteries, which can not provide the same current capability as an automobile battery, would not necessarily provide a suitable arrangement for the invention to work. It is obvious to those skilled in the art that some calculation of the electrode area would be required to maintain the appropriate minimum electrode voltage for power sources of the same nominal voltage but different internal impedance.

Bearing in mind the necessity for the voltage between electrodes to be a minimum of 3 volts (representative of the preferred range between 2 volts and 4 volts), the number of electrodes used can vary with the effective voltage of the power supply. For a voltage source of between 3 volts and 6 volts, two plates, one as anode and the other as cathode, would be the preferred number of plates. With an available effective voltage of between 6 volts and 12 volts, three plates would be the preferred number of electrodes, with the three plates being in a row, one outer plate acting as an anode, the other outer plate acting as the cathode and the central plate acting on one side as the cathode and the other side as an anode.

These plates are to be held at one end in a handle that is an electrical insulator. They may be either permanently affixed to the handle or temporarily affixed in a manner that allows easy interchange of the plates. The face-to-face separation distance of the plates may be anything from 1 mm to 50 mm, although 5 to 10 mm are preferred distances. At the handle end, some or all of the plates are to be connected to electrical conductors, which in turn are to be connected to a suitable power supply. At a convenient distance, preferably near the open end of the plates, an electrical insulator may be placed between the plates to ensure they do not touch during operation. Although desirable, this is not an essential feature of the invention.

DETAILED DESCRIPTION OF THE PREFERRED EMBODIMENTS

FIGS. 1 through 8 give an indication of several possible embodiments of portable apparatuses for treating water by electrocoagulation. In all cases, the plate electrodes are held at one position in an insulating assembly. Preferably this assembly should be a handle and, for the sake of simplicity, it will be referred to as a handle from now on. Electrical connections are made to some or all of the electrodes. Although all are illustrated with an electrical insulator keeping the ends apart, this is not an essential feature and is not required if the electrodes are sufficiently rigid that they will stay apart by their own rigidity. However, they must all include a mechanism by which the plates are supported in a single structure that keeps the plates at different potentials separated from each other. The plates must be connected to a direct current power supply, or a slowly varying alternating current power supply. A direct current power supply could consist of any of the following:— a) A battery, rechargeable or one time use
b) A solar panel
c) A portable manual powered electrical generator
d) A rectified alternating current power supply
e) Any other source that provides a uni polar polarity electrical voltage with current capability.

A voltage rectifier can be built into the handle of the device and producing a rectified AC or smoothed DC voltage. A transformer can be built into the handle so that mains AC could be applied to the water wand and produce the same desired effect. In the same manner, a circuit can be provided that produced a voltage that varied at a frequency of less than 20 cycles per second. This would be referred to as varying voltage direct current, as distinct from alternating current, which is available commercially at 50 cycles per second or 60 cycles per second. All of these variations are considered to be applicable to the described embodiments of the invention.

Arrangement of the Plates or Electrodes

As far as the geometry and arrangement of the plates is concerned, it is desirable that the plates have near equal areas and be approximately parallel in their separation. This creates uniform electrode wear and requires minimum power. However, if the plates are not regular shaped and approximately uniformly spaced, the apparatus will still work, but such operation will require greater power. Uniform and parallel or approximately parallel plates are thus preferred. However, uneven and/or irregular plates can be used.

Figure 1:
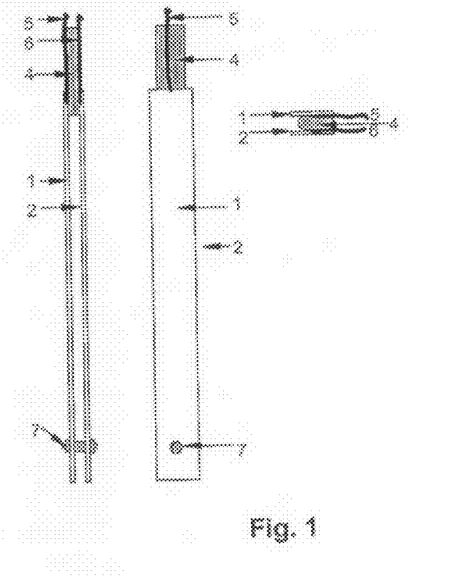
FIG. 1 is schematic side, front and top views of a first embodiment of a water treatment apparatus.

FIG. 1 illustrates a first embodiment of water treatment apparatus having two plates, 1 and 2, which are attached to an insulating handle 4. Each plate has an electrical connection, 5 and 6 respectively, attached. The insulating spacer assembly 7 holds the plates apart at the far end. Although shown in FIG. 1, it is not necessary if the insulating handle assembly is sufficiently strong to hold the self-supporting plates rigid for the entire length of the plates. It should also be noted that the handle does not necessarily have to be part of the insulating assembly. The handle could be a conductor and could even be one of the plates. However, an insulating assembly must separate the two active plates. These plates do not need to be parallel sided or parallel spaced. Indeed there are advantages in having the plates closer together at the end away from the insulating handle—they wear away at the ends faster, enabling complete use of the plates to produce the maximum quantity of water before being replaced. It matters only that they remain electrically isolated from each other, apart from the contact with the water. In operation, the plates 1, 2 are placed in water and a DC power supply, as defined above, with a voltage above 1 volt is applied across 5 and 6. For practical purposes, a voltage above 3 V DC is desired to cause the reaction to occur.

Figure 2:
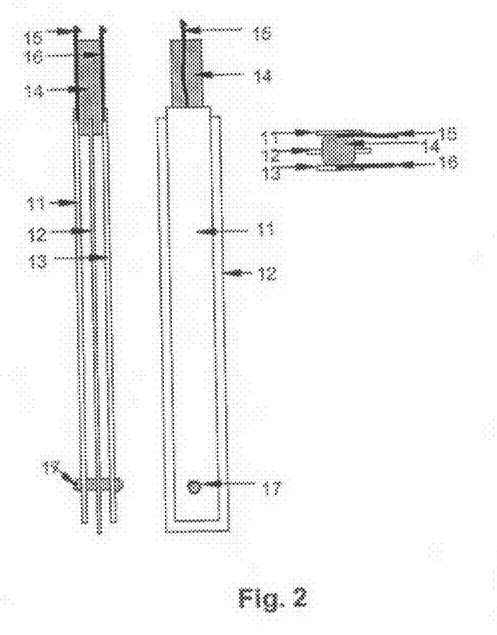
FIG. 2 is schematic side, front and top views of a second embodiment of a water treatment apparatus.

In the same manner, FIG. 2 illustrates a second embodiment of water treating apparatus using three electrodes 11, 12 and 13, which are held by an insulating handle 14 and connected to electrical connections 15 and 16 respectively. Electrical connection is made to 15 and 16. When this assembly is placed in the water, electrical current flows from 11 to 13, creating the reactions given above. However, because the intermediate electrode 12 is between the two, the current must flow through 12 when travelling between 11 and 13. This essentially means that the current is "used twice, making the device more efficient as far as electrical current is concerned. The only disadvantage of this is that the DC voltage must be double the voltage required for the two-plate arrangement shown in FIG. 1. The inner plate 12 is illustrated as being slightly larger than the two outer plates 11, 13. This is desirable from a practical point of view to prevent electrical current going directly from plate 11 to 13.

Figure 3:
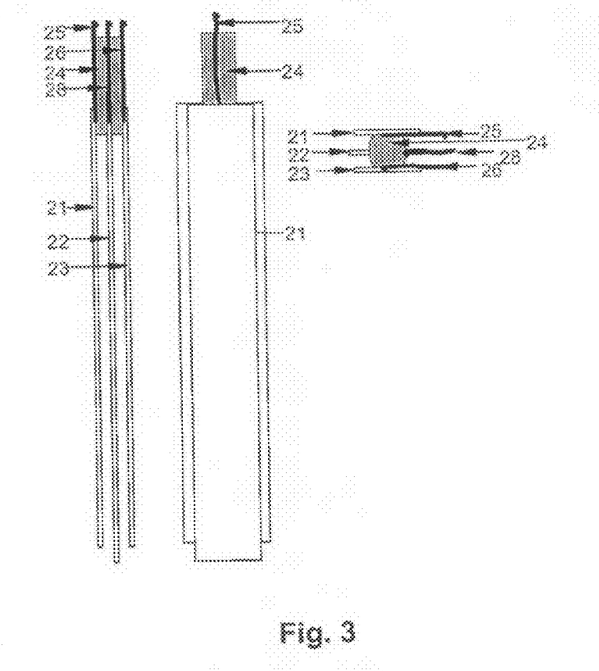
FIG. 3 is schematic side, front and top views of a third embodiment of a water treatment apparatus.

FIG. 3 illustrates a third embodiment of water treating apparatus using three electrodes embodiment, each of which has an electrical connection. It has two modes of operation. In one mode of operation, one polarity voltage is applied to the inner plate 22, via the electrical connection 28. The other two plates, 21 and 23 are electrically connected to the opposite polarity via the electrical connections 25 and 26. In this manner, operation is more suited for a low voltage high current power supply. In practice it would be best suited for a voltage supply in the range 3 V to 6 V, with a suitable current capability. In a second mode of operation, the opposing electrical connections are only made to the outer electrodes, 21 and 23, via the electrical connections 25 and 26. The inner electrode is left floating. This creates the same situation as illustrated in FIG. 2. This situation provides maximum efficiency for those power supplies with higher voltage and lower current capabilities. Selection between these two can be done by any convenient method, such as:
a) Hard wire selection depending upon the power supply and electrical conductivity of the water.
b) Mechanical switching between the two, either as deemed fit or depending upon the power supply and electrical conductivity of the water.
c) Automatically by means of an electrical circuit that could sense the parameters of the power supply and adjust the situation automatically.

Figure 4:
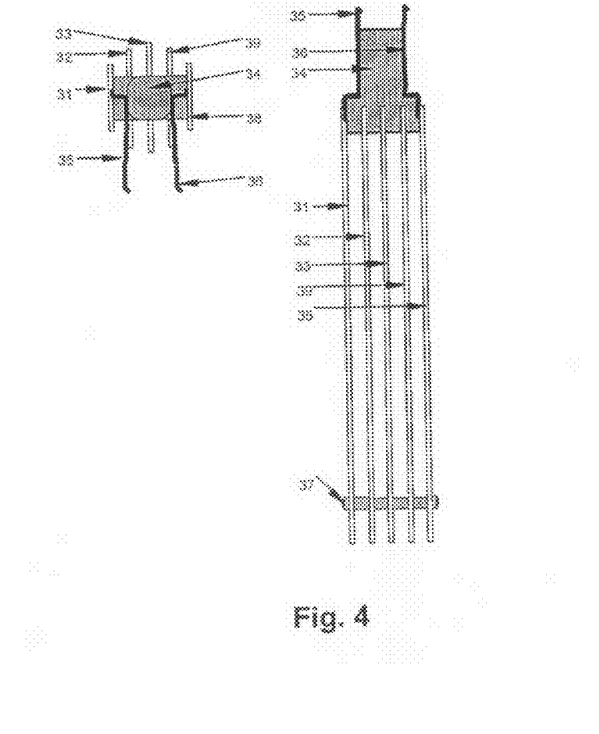
FIG. 4 is schematic top and side views of a fourth embodiment of a water treatment apparatus.

FIG. 4 illustrates a fourth embodiment of water treating apparatus in which five electrodes, 31, 32, 33, 39 and 40 are attached to an insulated handle 34. Only the two external electrodes, 31 and 40 are connected to the DC power source through the leads 35 and 36 respectively. In operation, the electrical current flows between 31 and 40, but because of the intervening plates 32, 33 and 39, the electrical current flows through each of these plates, essentially meaning that the same current is used several times. All the other features such as an electrically insulating assembly or handle to separate the plates are still applicable.

Although only examples of two, three and five plates connected in this manner, any number of plates can be employed. The more plates employed, the greater the voltage required, the limit being the voltage above which it is possible to experience an electrical shock and the tendency of the electric current to bypass some of the intermediate electrodes, reducing the efficiency of the process.

Figure 5:
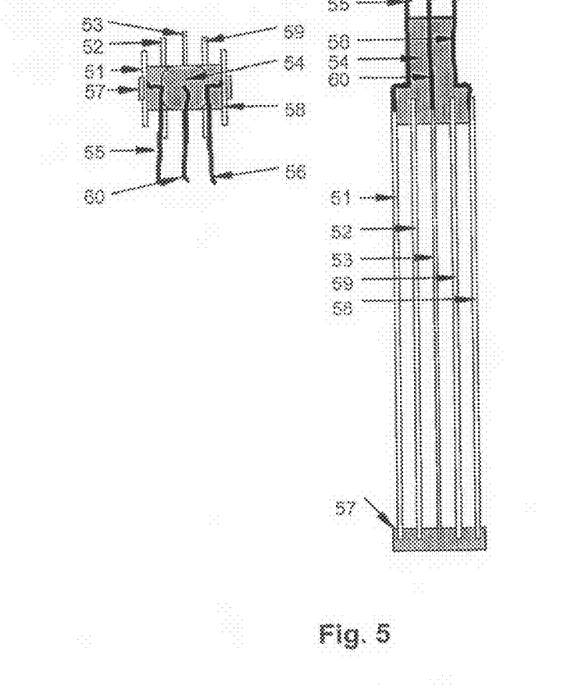
FIG. 5 is schematic top and side views of a fifth embodiment of a water treatment apparatus.
Figure 6:
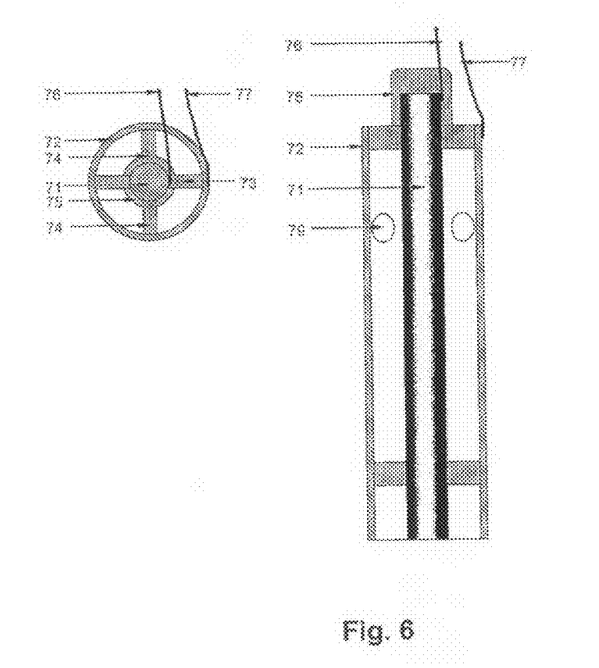
FIG. 6 is schematic top and side views of a sixth embodiment of a water treatment apparatus.

FIG. 5 illustrates a fifth embodiment of water treating apparatus in which five electrodes, 51, 52, 53, 59 and 60 are attached to an insulated handle 54. The outer electrodes, 51 and 60 are each connected to one polarity of the DC power source through the leads 55 and 56 respectively, while the inner electrode, 53 is connected to the opposite polarity through the lead 58. This situation favours that given in FIG. 4 for situations where the power source has a lower voltage and higher current capability. Alternate electrodes can equally be connected alternatively positive and negative. This would effectively increase the surface area of the electrodes, favouring situations where the electrical conductivity of the water is low or the capabilities of the DC power supply are more in keeping with a high current at relatively low voltage.

There is no limit to the number of electrodes that can be connected in parallel. This effectively increases the surface area of the electrodes for each polarity.

Figure 7:
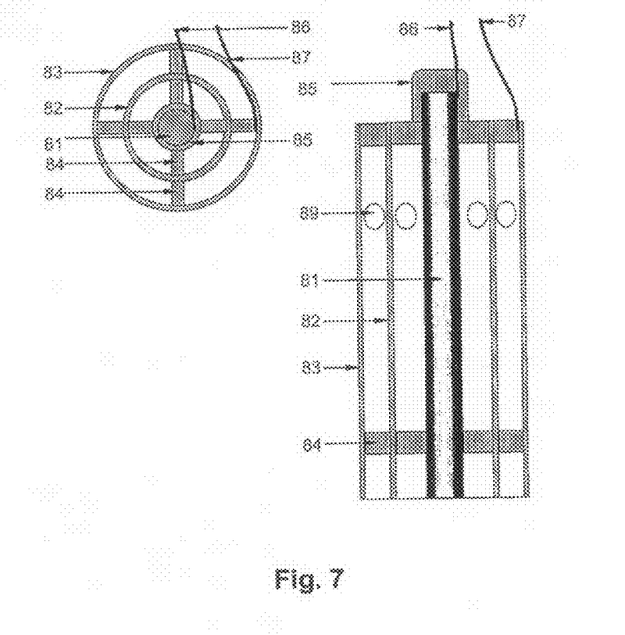
FIG. 7 is schematic top and side views of a seventh embodiment of a water treatment apparatus.

The water treatment apparatus can be configured in many different ways. For example, the embodiments shown in either of FIGS. 6 through to 8, in which the electrodes are composed of tubes of material, show one such array. The central rod 81 can also be a tube without affecting the principle of operation. It is connected to one polarity through connection 86, while the outer electrode 82 is connected to the other polarity through connection 87. The whole assembly is supported by insulating handle 75 which also contains insulting spacers 74 to keep the electrodes physically separate. When such an arrangement is placed in the water and operated, it is obvious that the pollutant will rise to the surface because of the production of gas bubbles through the reaction given in equation 3. As such it is desirable, but not essential, that the top of these closed path electrodes have an opening, 79, through which the water can move. Although this opening is shown as a hole, it could equally be a slit, as indicated with the reference numeral 100 of FIG. 8.

Figure 8:
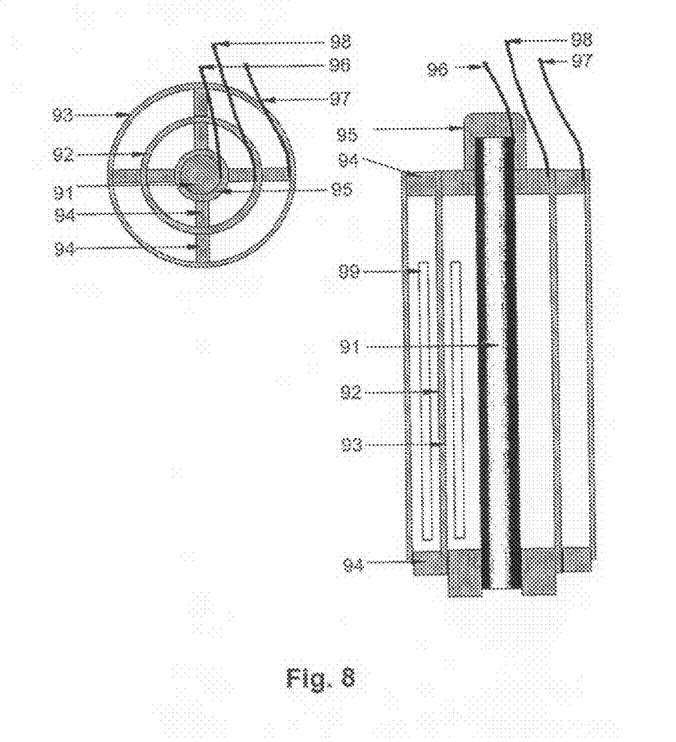
FIG. 8 is schematic top and side views of an eighth embodiment of a water treatment apparatus.

FIGS. 7 and 8 illustrate embodiments using three cylinders of material. As shown in FIG. 7, only the inner, 81, and outer, 83, electrodes are connected to the power supply, through connections 85 and 87 respectively. The middle electrode, 82, becomes a neutral electrode, forcing the current to pass through it, doubling the effect of the passage of electric current. The whole assembly is still held together by an insulating assembly, 84 and 85, that keeps the electrodes electrically insulated from each other. Again the holes in these closed loop electrodes may be desirable in some circumstances, but are not an essential part of the invention. FIG. 8 illustrates an embodiment in which there is electrical connection to all three electrodes, 91, 92 and 93. In this case, the inner electrode, 92, is connected to one polarity through 98, while the other two electrodes have a common connection to the opposite polarity through connections 96 and 97 being joined together. The assembly is still held together by an insulating assembly and handle, 94 and 95, with a slot providing a mechanism by which water can recirculate through the assembly. Again the slot may be an advantage in some circumstances, particularly if the whole apparatus is not inserted in the water. This slot can be equally applied to the embodiments described in FIGS. 6 and 7. The number of these circular or cylindrical electrodes can exceed the three indicated here, with a maximum set at 10 electrodes, it being considered too expensive to manufacture systems containing more than 10 electrodes.

Figure 9:
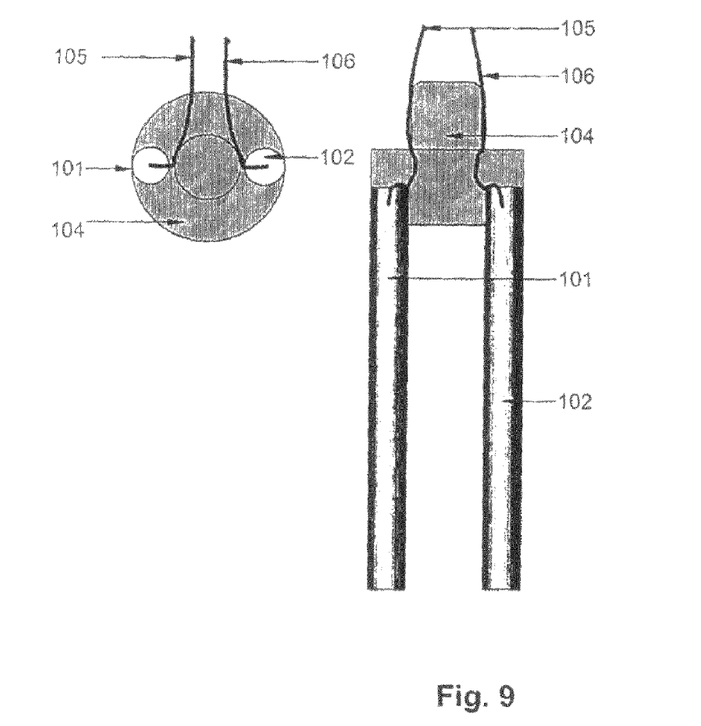
FIG. 9 is schematic top and side views of a ninth embodiment of a water treatment apparatus.
Figure 10:
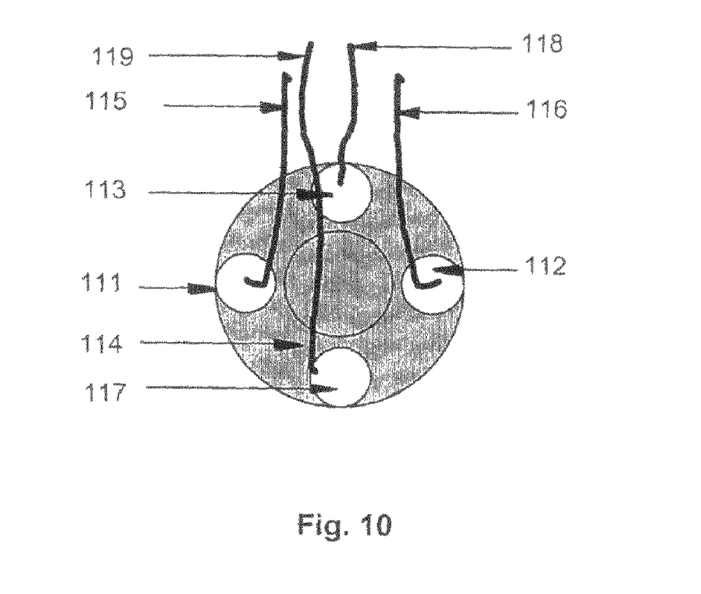
FIG. 10 is a schematic top view of a tenth embodiment of water treatment apparatus.
Figure 11:
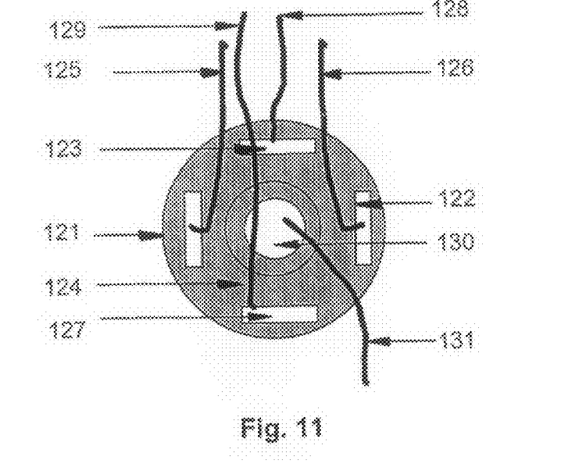
FIG. 11 is a schematic top view of an eleventh embodiment of water treatment apparatus.

The electrodes do not need to be plate-like in appearance, they could equally be rods, as shown in FIG. 9. Two only rod electrodes, 101 and 102, are held apart by an insulating handle 104, with electrical connections 105 and 106. One polarity of the power supply is applied to one of the electrodes, with the other polarity being applied to the other electrode. The rods can be of cross-section shapes other than a circular rod, even being square, rectangular, cylindrical or combinations thereof. Neither is the number of electrodes limited to two. FIG. 10 shows four rod electrodes, 111, 112, 113 and 117 held in place by an insulating assembly 114, with electrical connections 115, 116, 118 and 119 respectively. As an example, connections 115 and 116 would be connected to one of the polarities, while 118 and 119 would be connected to the other power supply polarity. Yet another embodiment is shown in FIG. 11, in which four rod-like electrodes, 121, 122, 123 and 127 surround an inner electrode 130. The inner electrode, 130, is connected to one polarity via connection 131, while the other outer electrodes 121, 122, 123 and 127, are connected to the other polarity by connections 125, 126, 128 and 129.

Figure 12:
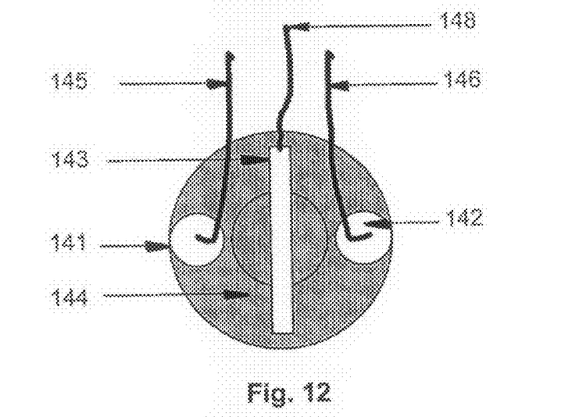
FIG. 12 is a schematic top view of a twelfth embodiment of water treatment apparatus.
Figure 13:
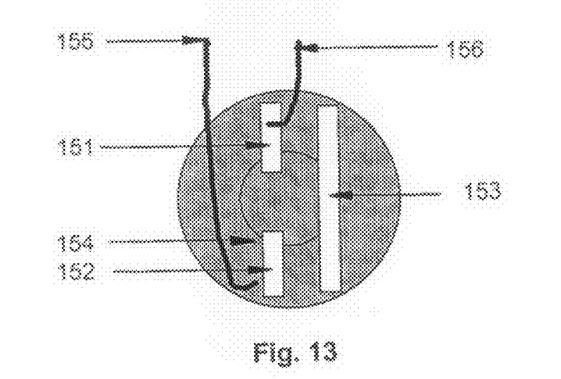
FIG. 13 is a schematic top view of a thirteenth embodiment of water treatment apparatus.

Additional numbers of rod electrodes can also be used, as for example a "circle" of electrodes of one polarity surrounding an inner electrode of a different polarity. Equally an array of alternative polarity electrodes is also possible. Equally the electrodes do not have to be of the same or even similar geometry. As shown in FIG. 12, it is possible for some of the electrodes to be of a different shape from others. Two rod-like electrodes, 141 and 142 are placed on opposite sides of a plate electrode 143. These must be held together in an insulating handle/support mechanism, 144. They can be connected with 141 and 142 having opposite polarities applied through their connections 145 and 146, with the central electrode, 143, not being connected and acting as a neutral between the two active electrodes 141 and 142. Alternatively the electrical connection to 141 and 142 through 145 and 146 can be the same, while the central electrode, 143, is connected via 148 to the opposite polarity. In another alternative illustrated in FIG. 13, electrodes 151 and 152 are connected to alternative polarities via connections 155 and 156, with electrode 153 being neutral to both of them. It should be noted that joining the two electrodes 151 and 152 to the same polarity and making 153 the opposite polarity becomes the same as the arrangement shown in FIG. 1.

The handle can be made of an insulating material and the electrodes may be connected by any suitable means. They may be permanently attached or connected through some quick fit method. Permanent attachment makes the device a use once and throw-away device, while a quick fit method makes the device a continuous use one with replaceable electrodes. The handle can be one that can be grabbed, or it can simply be a set of spacers similar to that shown as 7, 17, 27 or 37 in FIGS. 1, 2, 3 and 4 respectively. The handle must enable electrical connections to be made to the appropriate electrodes.

Figure 14:
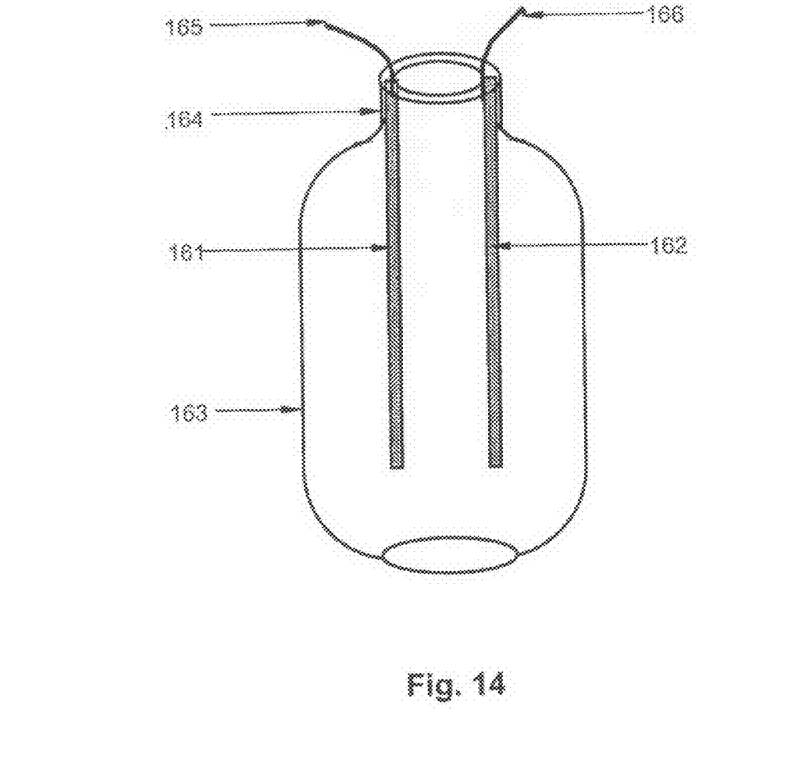
FIG. 14 is a schematic perspective view of a fourteenth embodiment of a water treatment apparatus.

In a similar manner, it is possible to have the electrodes supported by the container, as illustrated in the embodiment shown in FIG. 14. Electrodes 161 and 162 are held in place in the container 163 by a mounting mechanism, 164, with electrical connections 165 and 166, to which opposite polarity voltages are applied. This whole assembly can still be hand carried. The mounting mechanism, 164, may be either permanently affixed and the container, 163, or it may be removable, in which case the assembly without the container becomes the same as that shown in FIG. 1. The arrangements shown in FIGS. 1 through 13 can be used in place of the two-electrode arrangement shown here. If, however, the electrodes are removable from the container, then the apparatus functions in a similar manner to that shown in FIGS. 1 through 13 and portability is preserved.

Figure 15:
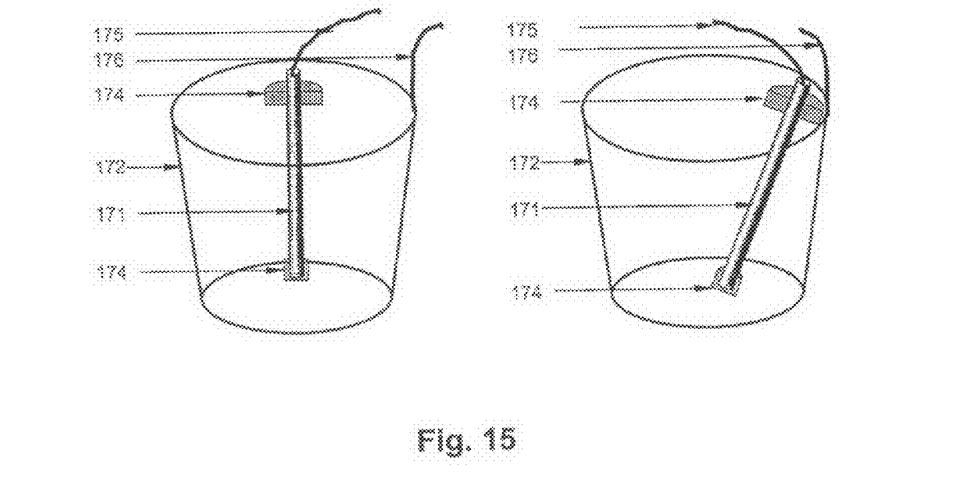
FIG. 15 is two perspective views of a fifteenth embodiment of a water treatment apparatus.

In a similar manner, it should also be pointed out that a metal container could also be used as one of the electrodes, as illustrated in the embodiment of FIG. 15. Item 172 is both the container and one of the electrodes, connected to the power supply by connector 176. The other electrode 171 has a connector 175 and an insulating component, 174, which enables it to be rested in the container 172 without making electrical contact with it. Portability is again preserved if the electrode 171 is not permanently affixed to the container 172.

Other electrode arrangements can also be used. In particular, the embodiments shown in FIGS. 6, and 7 would also be useful, when the electrical connection from the outer electrode is removed from the assembly and connected to the container.

A weight of less than 15 kg is considered easily handled by the "average" adult male. Because these apparatus should essentially be used when stationary, this is the weight of the empty container and electrode set. Once the water is added, the weight may be anything that the container can handle.

Many different geometries are possible for the embodiments of water treatment apparatus, with the actual configuration being determined by the voltage and current available from the power supply and the conductivity of the water.

The dimensions of the electrodes can be any convenient dimension that makes them easily able to be handled by an average adult male using one hand. Convenient dimensions can be 100 mm wide by 500 mm long by 3 mm thick. However, they could equally be rods 6 mm diameter by 1000 mm long, or 20 mm diameter by 100 mm long. The dimensions are not the important feature. It is the use of sacrificial electrodes that generate coagulating chemical ions and gas bubbles that are important.

The electrodes can have any convenient spacing. However, dimensions smaller than 1 mm apart are not considered because the spacing is too small for the coagulated pollution particles to escape from the space between the electrodes. In a similar manner, electrodes with a spacing greater than 200 mm are not considered to be suitable because the power required to drive the electric current between the two electrodes is considered too great for the process to be efficient. An electrode spacing of between 5 mm and 20 mm is considered the most efficient range. Additionally, electrode spacings of between 2 mm and 10 mm also impart certain advantages. These distances allow the space between the electrodes to be cleaned, while at the same time are not so great that considerable efficiency is lost by driving the electric current—carried by the ions—through the water.

Composition of the Plates or Electrodes

This embodiments of water treatment apparatus described above operate on the principle of some of the electrodes being sacrificed by the passage of an electric current through the metal/water surface, liberating active metal ions. The reactions given in equations 1 and 2 occur at the anode electrodes. As such the anodes—the positive polarity electrodes—must be composed of a sacrificial metal that will give up the appropriate ions. The preferred anode metal is aluminium (Al), but can equally be iron (Fe), both of which are trivalent metals. Another suitable metals is magnesium (Mg), which can assist in the removal of some types of particles from polluted water. In another variation, the anode can be composed of copper (Cu), which is a powerful algicide and can assist in the removal of algae from polluted water. Additionally the use of a silver anode provides ions that kill many pathogens and thus disinfect the water.

The cathodes can consist of the same metal as the anode, one of those metals or any other inert metal, such as stainless steel. One of the best cathode materials is platinum coated titanium, it being an inert metal that will not give any contamination to the water. It should be noted that if aluminium is used as the cathode, the reaction:

$$Al+4H_2O+e^- \text{ gives } Al(OH)_4^-+2H_2 \quad (4$$

Or something similar to it can occur at the cathode. This has the advantage that it assists in liberating more aluminium into the water, cleaning it faster and with less electricity usage. The reactions in equations 3 and 4 are competing cathode reactions, meaning that reaction 4 is not the total reaction occurring at the aluminium cathode.

Any neutral electrodes will, by necessity, have one side acting as a cathode and the other as an anode. As such, the neutral may likewise be composed of the same material as the anode, e.g., aluminium, iron, magnesium or copper. Or it may be composed of two metals, the cathode acting side of which is made of an inert material such as stainless steel or platinum coated titanium (or equivalent inert material). The other side is composed of an anode metal, (Al, Fe, Mg, Cu). In this case, the two different metals must be electrically combined.

When aluminium is used as the cathode material, an oxygen rich insulating layer builds up on the active surface of the cathode. If not removed, this layer ultimately prevents the passage of an electric current through the cathode, stopping the reaction from occurring. When this occurs, this "oxide" layer of material must be removed by some physical or chemical process. Scraping the surface with a hard sharp object is usually sufficient to ensure the appropriate removal of the material.

The presence of materials with extreme zeta potentials and other sources of residual electric charge can also result in the accumulation of materials on the surface of the electrodes. Again this can be sufficient to prevent the passage of the electric current when the electrodes are in the water with a voltage applied. Again, when this occurs, it will be necessary to remove the built up material by scraping them with a hard sharp surface.

The number of electrodes required is determined by a combination of the following:—
1) The available power supply. With less than 6 volts, it is preferred that all electrodes be connected alternatively positive and negative. However, this does not preclude the use of higher voltages for alternatively connected electrodes—it merely diminishes the efficiency of the process.
2) Above 6 volts, it can be more efficient to use a single neutral electrode between the anode and cathode electrodes.
3) Above 12 volts it can be more efficient to use two neutral electrodes between the anode and cathode electrodes.
4) Above 15 volts, it can be more efficient to use three neutral electrodes between the anode and cathode electrodes.

This can be extended to higher voltages and more neutral electrodes, but it generally means that the power supply may not be conveniently available. The use of more electrodes under the situations not described, but otherwise fitting into this pattern, does not prevent the inclusion of this technology.

In the same manner, the size and shape of the plates is variable. Long rectangular plates connected at one end are easier to manufacture. Short square or squat plates will fit more easily into a shallow bucket, giving a larger surface area and therefore a faster cleaning than the slender plates illustrated in FIGS. 1 through 4. Non-rectangular plates are more difficult to manufacture, but can have advantages in the ease of fabrication and or replacement. Closed. loop electrodes, as illustrated in FIGS. 7 and 8, can have advantages in higher conductivity water because it makes it more difficult for the electric current to flow through the water from one electrode to the other, bypassing the neutral electrode.

In a similar manner, external connections to the plates can be used, which connections can be added or removed as required depending upon the battery being used. Accordingly, the use of plates electrically connected to a DC power supply for the purpose of generating coagulating cations and gas bubbles will aid in cleaning small quantities of polluted water. These plates can be curved or bent. The plates need to be open in order that the gas bubbles can escape from the vicinity of where they are generated and do allow the captured coagulant to float to the surface.

The sides of the plates are open. This allows the floated floc to escape from the vicinity of the electrodes and form at the surface. The process works by coagulating the pollutant particles, which then enables their much easier removal. While there is a possibility of "electrolysis" of pathogens within the water, there is no guarantee that this process would either remove or kill them. In order to be sure the water is suitable for drinking, it is desirable to kill all residual pathogens. There are several methods by which this can be achieved, including the traditional chlorine or bromine disinfection, or other chemical methods. They have the disadvantage of requiring additional supplies. Other methods of ensuring the killing of all pathogens is to add metals that are deleterious to micro-organisms. Two such metals are copper and silver. Small quantities of either added to the water will react with bacteria and viruses and render them harmless. These can be added by ensuring that at least one of the anodes either contains one of these metals, or that one of them is in electrical contact with one or more of the anodes, or that an additional anode containing either of these metals is employed. In this manner small quantities of silver or copper are added to the water during the electrocoagulation process. Part of these small amounts may be removed during the settling process.

It is important that the amount of disinfectant metal, silver or copper, ions added is in proportion with the amount of coagulant metal added. This is controlled by the relative surface areas of the coagulant metal and the disinfectant metal, the valence of the ions and their atomic weights. Silver is monovalent with an atomic weight of 108, while aluminium is trivalent with an atomic weight of 27. As an example, if it is desired to add 0.5 mg/L silver and 10 mg/L aluminium, it requires an aluminium surface area 20×¾=15 times that of silver. 20 comes from the ratio 10/0.5 and 3 comes from the requirement of 3 times as many electrons to release an aluminium ion compared to a silver. The 4 comes from the relative atomic weight differences between aluminium and silver. This calculation assumes that the aluminium and silver are equally spaced from the cathode. It is apparent to those skilled in the art that the use of alloys of these metals, for example brass being an alloy of copper and zinc, still allows the action of the main metal to occur.

Operation

The use of the embodiments of water treatment apparatuses described shall now be described. Firstly, the water to be cleaned is placed in a container. This container can be of any reasonable size and geometry and can be made of any suitable material such as plastic (clear, translucent or opaque, steel, copper or otherwise as suitable. If a metal container is used, the electrode array must be such that resting the electrodes on the metal container will not cause them to become electrically connected to each other through the metal container. The container must also have an opening at the top that is large enough for the electrodes of the apparatus to be inserted. It may or may not have a drain tap at the bottom for draining out the cleaned water. If the water container is made of clear plastic it will be easier to determine when the water is clean and the reaction is complete. The size of the container is not critical, but its depth should be of the same order of magnitude as the length of the electrodes and its surface area should be not much larger than twenty times the "swept" area of the electrodes. For this purpose, the swept area of the electrodes is the diameter of a circle that will fully enclose the electrodes. The figure of 20 times the swept area is only a guide for practical purposes—the system will still work even if the swept area is much larger. "Swept" areas as large as 50 times, or even 100 times will still undergo considerable cleaning action. Larger volumes and larger swept areas simply mean that it will take much longer to clean the water and ultimately, if the water volume is too large, it may not be possible to clean it.

The container need not be a formal one, and any container which held water could also be used. These could include a plastic sheet appropriately draped in a manner that enabled a volume of water to be retained, which volume had sufficient depth so as to enable the electrodes to be inserted. Ultimately, even a puddle of water retained in a clay surface could be treated in this manner and the treated water appropriately removed for use.

Referring initially to FIG. 1, the electrodes are placed in a container of water, which causes a current to flow between the electrodes 1 and 2. At the anode, the reaction given in equations 1 or 2 (or the equivalent for other metals) will occur, liberating coagulating metal ions, while at the cathode, gas will be liberated. Referring to FIG. 2, and other situations in which there is one or more intermediate neutral electrodes, the surface closest to the anode will act like a cathode, while the surface closest to the cathode will act like an anode. The surface acting as the anode will give rise to metal ions according to either of reactions 1 or 2 and the other surface acting as the cathode and liberate gas.

The metal ions will coagulate (i.e. bind) with the pollutants, making them larger. They will also result in the coagulated pollutants binding with the liberated gas bubbles. This will cause much of the pollutant to rise up in the water and reach the surface where they will often form a stable structure on the surface. Because of this feature of the bubbles flowing up the electrodes, the water in the vicinity of the bubbles will flow upwards with the bubbles. For this reason, it is desirable that the apparatus has openings at the top that allow the treated water to pass away from the electrodes. This is a natural feature of the plate and rod electrodes, but not necessarily of the closed loop electrode designs shown in FIGS. 6 through 8. The existence of such an orifice that allows the water to flow out is not necessary if the whole of the electrodes in the wand are placed under the surface of the water. If the apparatus does not have this opening, the process may still work, but with reduced efficiency. As such, these openings, orifices or slots are desirable.

It should be pointed out that a sufficient voltage must be maintained between the anode and cathode for there to be enough energy for the reactions given in equations 1 through 4 to occur. In general this requires a DC voltage of at least three volts per anode-cathode set. For practical purposes, it is desired to be greater than 4 volts. However, it is possible for some reaction to occur at a voltage as low as 2 volts per anode-cathode set. As such, the minimum anode—cathode voltage, per set of anode-cathode in series, which forms part of this invention, is set at 2 volts. It should also be noted that this voltage is peak to peak and not root mean square, as far as rectified AC power supplies are concerned. Voltages below 1 volt are considered too low to be of practical use.

Most power supplies have a voltage and current limitation. Once a voltage has been applied to the electrodes, the resistance between the water and electrodes determines the current that will flow between them. If the conductivity of the water is too high for the surface of the electrodes, the voltage output of the power supply may drop so that the minimum voltage is no longer maintained. At this stage, even though the reaction at the cathode will generate gas bubbles, the reaction at the anode will not be sufficient to liberate metal ions and the process will not work. For a given power supply and water conductivity, this can be overcome by putting less area of the electrodes into the water until such time as the voltage increases and the reaction occurs again.

There are three mechanisms for determining how much of the electrodes should be inserted into the water. In a first mechanism, the conductivity range of the water to be treated is determined, along with the characteristics of the battery or power supply (characteristics includes voltage and internal resistance characteristics) and the area of the electrodes is calculated to maintain the appropriate voltage and thus have the process work.

In a second mechanism, the process is observed to see if a layer of material starts to form over the surface of the electrodes within a few minutes. If no such layer starts to form, the electrodes should be withdrawn a little more and again observed. The process is repeated every few minutes until either the electrodes are withdrawn from the water or a layer of material is observed to start to form on the surface. This is clearly a time consuming and unsatisfactory way of doing it.

In the third mechanism the voltage between the anode and cathode is monitored. One method of achieving this is to connect a volt-meter across the anode and cathode and monitor the voltage. If the voltage drops too low, the electrodes are withdrawn until the voltage is above the minimum required voltage. Another method of achieving the same result is to provide a voltage monitoring circuit across the anode and cathode. When the voltage is above the minimum voltage, the voltage monitoring circuit illuminates a light emitting diode (LED) (or other suitable indicator such as a lamp, a signal in a liquid crystal display, suitable mechanical device or any other method of indicating then voltage is satisfactory). When the voltage drops below the minimum required, a different signal is given. This may be the LED is extinguished, or changes colour (or any other suitable electro-mechanical-audio-visual signal to indicate a failure). At this stage, the electrode set that constitutes part of this invention is withdrawn until the electronic, mechanical, audio or visual signal indicates that the voltage is adequate and that the process is operating efficiently.

The ability to monitor the voltage is a desirable feature. However, if the area of the electrodes is chosen to adequately match the capabilities of the power supply and the conductivity of the water, the design will ensure that the voltage will always be above the minimum required voltage. As indicated above, even if the voltage should fall below the minimum desired, the user has a mechanism of working that out, even if the process does use a certain amount of the available electrical power.

The liberated coagulant metal ions will bind to the pollutant particles in the water through the well-known coagulation reactions, making those particles slightly larger. The released gas will form micro-bubbles that will capture the coagulated pollution assemblies and render them buoyant. These buoyant assemblies will then float to the surface, forming a quasi-stable layer. As the pollutant rises, the water will appear cleaner. The action of the gas rising from the electrodes will cause the water to rise with it. This will make sure that the water throughout the container circulates through the plate electrodes. This has two effects. The first is that there is no need to stir the electrodes through the water as it will all pass through them and thus all be cleaned (provided the size of the container is not so large that such can not occur). The second is that micro-organisms within the water will pass between the plates, where they will be subjected to a strong electric force. While such may not be sufficient to kill all micro-organisms, it will decrease the motility of many of them, considerably reducing the numbers of live bacteria left in the water after it has been removed from the floc.

Additionally the use of copper and/or silver anodes in addition to the aluminium and/or iron anodes will put Cu and/or Ag ions into the water. Although some of these ions will be removed by the coagulating metals, some will remain to immobilize the residual pathogens given the few hours standing necessary to allow the floc to settle out from the water. In this manner, the water is disinfected as well as being cleaned.

At a time adjudged suitable by the operator (e.g. when the water appears clean, or when the floc at the surface of the water starts to turn white) the electrodes can be fully withdrawn from the water. Care should be taken not to stir up the water too much, so that the floc on the surface, which contains the floated pollutant, will not be disturbed and sink back into the water. It is advantageous for the water to remain undisturbed to keep the floc at the top of the water. Alternatively, power to the apparatus can be disconnected, either by removing the power supply from the wand, or turning off a switch between the power supply and wand. It should be pointed out that once the reaction is complete, even if the water is disturbed such that the floc is broken and redistributed into the water, it will remain separate from the water and will slowly sink to the bottom.

Even though the reaction has stopped, there will still be some bubbles in the body of the water. It is thus desirable to wait a few minutes after the apparatus is withdrawn, for all the bubbles to rise up, giving maximum cleaning to the water. This time period could be something like 5 to 30 minutes, depending upon the size of the container. There are advantages to allowing the water to stand for several hours after the reaction has stopped. The smallest bubbles will have risen out of the water and any coagulated pollutants will to have much longer to settle to the bottom of the container. Any un-reacted aluminium will settle out onto pollutants or particles. The longer the water stands, for time periods up to several hours, the clearer looking will be the treated water.

At some convenient time period after the floc has risen to the surface, it can be removed. This can be done by such techniques as squeezing the container, thus raising the level of the water and causing the floc to flow over the top, or removing the floc by scooping it off the surface, or any other suitable technique. This action leaves less pollutant in the water to settle out. If this floc removal process disturbs the floc, the water can be agitated to break up all the remaining bubbles and the floc will sink to the bottom after a few hours, leaving crystal clear water. This water can simply be poured off to give clear disinfected water suitable for human consumption from many otherwise unsuitable sources.

At a further time judged to be suitable, the cleaned water can be withdrawn from the container. If the floc has not been removed, it is desirable when this is done that the floc on the surface is not disturbed when the water is withdrawn. There are several methods of doing this. One is to use a container that has a tap close to the bottom. At that appropriate time, the tap is turned on and the water is drained out. If such a container is not available, the water can simply be siphoned out using a small hose. One end of the hose is placed in the bucket, a vacuum created at the other end and the water withdrawn. It is important that this is done in a controlled manner so as not to disturb the floc. Care needs to be exercised when doing this task to make sure that the floc is not disturbed and the pollutant moved back into the water. A third method is to use a bucket with a pouring spout and simply pour the water out. A fourth method is to use a bucket with a pouring "lip". Simply push the floc away from the lip and pour out the majority of the contents of the bucket. Please note that in these cases, it is desirable to keep looking at the water being poured out so that the removed pollutant does not contaminate the water again.

Another alternative can include stirring the treated water, causing the floating floc to break up and all the particles to settle to the bottom of the container. This leaves the water at the top free of all pollutants and it can simply be poured off or otherwise removed. Another alternative is to pour the water through an appropriate filter. In some cases this can simply be a coarse filter, which did not remove the particles before the electrocoagulation process. If this latter process is used, it is best to allow the water to stand for several hours, anything up to 24 is considered advantageous, before passing the water through the filter.

As a general rule, the longer the water is allowed to stand after the apparatus has been turned off or withdrawn, the less treatment that is required to clean a given volume of water.

Results

When used in the appropriate manner, this technique is capable of removing some 95% to 99.9%+ of many pollutants in the water in one simple action. The amount removed depends upon the nature of the pollutant. It should be noted that the system is only considered suitable for lightly polluted water, that is, water contaminated by mud and septic/sewage overflow and possibly some light industrial or mining pollution. It is not considered suitable for treating septic or sewer wastewater or heavily industrially polluted water. However, if the water treatment apparatus is used in accordance with instructions, the pollutant removal rates are typically as follows:

| Pollutant | Percent Removal |
| --- | --- |
| Total suspended solids - mud, clay | 99+ |
| Turbidity | 99+ |
| Bacteria* | 99+ |
| Parasites* | 99+ |
| Mercury, cadmium, arsenates, lead and other heavy inorganic ions | 95-99+ |
| Large protein molecules | 95-99+ |
| Salinity | <10 |
| Colour - larger dye molecules, tannins | 95+ |

Although the removal rate is only approximately 99%, the use of copper/silver means that the residual pathogens are inactive.

After treatment, the water will look clear and have most of the pollutants and pathogens removed. It should appear crystal clear and be much more palatable than the original raw water. In most cases the residual active pathogen rate will be nil. However, there is no guarantee that this process will remove/destroy all the pathogens and as such it cannot be considered as a suitable single step process in producing potable water from all reasonable sources. In water sources that are extremely polluted, other sources of disinfection should be considered.

Advantages

The primary advantage of the portable water treatment apparatuses described above is they are simple equipment that can remove a wide array of pollutants that are also easy to use and reuse over again by people with very little instruction.

The portable water treatment apparatuses described above can also be easily manufactured, carried, and operated almost anywhere with very little electric power and by persons with very little technical capability or assistance.

Water treated with the portable water treatment apparatuses described above has most of the pollutants removed and is otherwise vastly more suitable for drinking. Other benefits include:

1) The amount of power required by the portable water treatment apparatuses described above is very small. Typically, heavily polluted water could have a turbidity of 100 NTU and contain traces of bacteria. The portable water treatment apparatuses described above could use as little as 0.1 amp hour at 3 volts to clean up to 10 litres of water. Higher levels of pollution would require more electricity to clean the water, lower levels would mean that even more water could be cleaned.

2) The very small amount of power required by the portable water treatment apparatuses described above means that a single six volt five amp hour battery could clean over 500 litre of water. A single small commercial nine-volt battery could be used to clean up to fifty litres of water.

3) The portable water treatment apparatuses described above could be used with a solar panel. On a good clear day, a 12 volt 10 watt solar panel could clean up to could power two or three of the apparatuses and clean over 1,000 to 2,000 litre of polluted water per day. This is a more efficient water treatment than any other mechanism currently available.

4) With small power supplies being available, the ability to provide clean drinking water into remote locations would be considerably enhanced using the portable water treatment apparatuses described above. It also enables persons travelling in remote locations to obtain water along the way, instead of having to carry a full supply with them. Equally important, it enables the provision of clean water with the minimum of infrastructure, as for example for aid relief following natural disasters.

Although the invention has been described with reference to preferred embodiments, it will be appreciated by those skilled in the art that the invention may be embodied in many other forms.

The invention claimed is:

1. A method of treating polluted water by electrocoagulation with a portable water treatment apparatus, the method comprising the steps of:
    providing a portable water treatment apparatus comprising: at least two electrodes; and a housing, electrically isolating said at least two electrodes, to which said at least two electrodes are fixed spaced apart from one another;
    submerging, at least partially, said at least two electrodes in polluted water;
    providing an electrical potential to said at least two electrodes to cause at least one of said at least two electrodes to be sacrificial and provide coagulating ions to the polluted water;
    determining the extent of coagulation in the polluted water; and
    gripping said housing and manually adjusting the extent of submergence of said at least two electrodes in the polluted water in order to adjust said determined coagulation.

2. The method according to claim 1, wherein the step of determining the coagulation in the polluted water includes monitoring the voltage across said at least two electrodes and, if the voltage drops below a predetermined level, reducing the submergence of said at least two electrodes in the water until the voltage is above or at the predetermined voltage.

3. The method according to claim 1, wherein the step of determining the coagulation in the polluted water includes determining the conductivity range of the water to be treated along with the characteristics of the supply electrical potential and calculating the area of said at least two electrodes which must be submerged in the polluted water to maintain the predetermined voltage sufficient for coagulation.

4. The portable water treatment apparatus according to claim 1, wherein said cylinder defines an opening adjacent said handle for providing movement of said polluted water therethrough, and wherein said handle further comprising at least one insulating spacer to separate said at least two electrodes.

5. A portable water treatment apparatus for treating polluted water by electrocoagulation, the portable water treatment apparatus comprising:
    a first electrode defining a volume, said first electrode is in the form of a container having an open upper end;
    at least one second electrode; and
    a means to electrically isolate said first electrode from said at least one second electrode to allow introduction of said at least one second electrode into said volume without contacting said first electrode;
    wherein polluted water is introduced into said volume to at least partly submerge said at least one second electrode and an electrical potential is provided to said first electrode and said at least one second electrode, at least one of said first electrode and said at least one second electrode is sacrificial so as to provide ions to the polluted water;
    wherein and the second electrode is in the form of a rod having an insulated cap on one end and an insulated peripheral spacer at, or near, its other end;
    wherein said means to electrically isolate said first and at least one second electrodes is a handle formed of electrical insulating material, said handle being configured for manual gripping, said electrodes being affixed to said handle and at least two of said electrodes being connected to an electrical supply at an end of said handle to provide said electrical potential.

6. A portable water treatment apparatus for treating polluted water by electrocoagulation, the portable water treatment apparatus comprising:
    at least two electrodes; and
    a housing, electrically isolating said at least two electrodes, to which said at least two electrodes are fixed spaced apart from one another;
    wherein said at least two electrodes are at least partly submerged in polluted water and provided with an electrical potential, at least one of said at least two electrodes is sacrificial so as to provide ions to the polluted water;
    wherein said housing is a handle formed of electrical insulating material, said handle being configured for manual gripping, said electrodes being affixed to said handle and at least two of said electrodes being connected to a power supply connection at an end of said handle to provide said electrical potential when in electrical communication with a power supply.

7. The portable water treatment apparatus according to claim 6, wherein said at least two electrodes are formed from any one of metal foil wrapped around a solid former, plates of thin bent metal, and plates of flat metal and cylindrical metal rods, such that at least two of said electrodes have a cross-section of any one of oval, circular, rectangular, annular, and closed shape.

8. The portable water treatment apparatus according to claim 7, wherein said at least two electrodes comprising three electrodes arranged substantially parallel, side-by-side and spaced apart with said electrical potential supplied to the outermost two of said three electrodes.

9. The portable water treatment apparatus according to claim 7, wherein said at least two electrodes comprising three electrodes arranged substantially parallel, side-by-side and spaced apart with said electrical potential supplied to each of said three electrodes, with the outermost two electrodes having the same polarity and the inner electrode having the opposite polarity.

10. The portable water treatment apparatus according to claim 7, wherein said at least two electrodes comprising five electrodes arranged substantially parallel, side-by-side and spaced apart with said electrical potential supplied to the outermost two of said five electrodes.

11. The portable water treatment apparatus according to claim 7, wherein said at least two electrodes comprising five electrodes arranged substantially parallel, side by side and spaced apart with said electric potential supplied to the two outermost and one central of said five electrodes.

12. The portable water treatment apparatus according to claim 7, wherein the said at least two electrodes are in the form of a rod substantially concentrically positioned within a cylinder.

13. The portable water treatment apparatus according to claim 7, wherein said at least two electrodes are in the form of substantially concentrically arranged inner and outer cylinders and a rod substantially concentrically arranged within said inner cylinder, and wherein said electrical potential is supplied to said rod and said outer cylinder.

14. The portable water treatment apparatus according to claim 7, wherein said at least two electrodes are in the form of substantially concentrically arranged inner and outer cylinders and a rod substantially concentrically arranged within said inner cylinder, and wherein said electrical potential is supplied to said rod, said inner cylinder and said outer cylinder.

15. The portable water treatment apparatus according to claim 7, wherein said at least two electrodes are in the form of two substantially parallel spaced apart rods.

16. The portable water treatment apparatus according to claim 7, wherein said at least two electrodes are in the form of flat plates, arranged substantially parallel, angularly spaced apart around a rod that constitutes a central longitudinal axis, and wherein said electrical potential is supplied to all of said plates and central rod.

17. The portable water treatment apparatus according to claim 7, wherein said at least two electrodes are in the form of a flat plate and two substantially parallel spaced apart rods, and wherein said electrical potential is supplied to said flat plate and both of said rods.

18. The portable water treatment apparatus according to claim 7, wherein said at least two electrodes are in the form of a relatively wide flat plate and two relatively narrower flat plates parallel to each other and spaced apart from said relatively wide plate, and wherein said electrical potential is supplied to said two relatively narrow flat plates.

19. The portable water treatment apparatus according to claim 7, wherein at least one of said at least two electrodes is comprised of at least one material selected from the group consisting of aluminum, iron, magnesium, copper, stainless steel, platinum coated titanium, and silver.

20. The portable water treatment apparatus according to claim 7, wherein said power supply can be either direct current or rectified alternating current, and can produce a voltage between about two volts to forty volts.

21. The portable water treatment apparatus according to claim 7 further comprising an on/off control for said power supply.

22. The portable water treatment apparatus according to claim 6, wherein said handle includes electrical connection to a voltage rectifier for producing a rectified voltage, and a transformer, said voltage rectifier and transformer being in electrical communication with said power supply.

* * * * *